(12) United States Patent
Gehde

(10) Patent No.: US 6,431,409 B1
(45) Date of Patent: Aug. 13, 2002

(54) EXTRUDER WELDING DEVICE

(75) Inventor: Michael Gehde, Aachen (DE)

(73) Assignee: Wegener GmbH (DE)

( * ) Notice: Subject to any disclaimer, the term of this patent is extended or adjusted under 35 U.S.C. 154(b) by 0 days.

(21) Appl. No.: 09/657,162

(22) Filed: Sep. 7, 2000

(30) Foreign Application Priority Data

Sep. 8, 1999 (DE) ..................... 299 15 768 U

(51) Int. Cl.⁷ ............................................. B65D 88/54
(52) U.S. Cl. ........................................ 222/334; 222/413
(58) Field of Search .................. 222/146.2, 146.5, 222/334, 413

(56) References Cited

U.S. PATENT DOCUMENTS

| | | | |
|---|---|---|---|
| 3,739,958 A | * 6/1973 | York | 222/413 |
| 3,888,393 A | * 6/1975 | Drori | 222/413 |
| 3,953,006 A | 4/1976 | Patarcity et al. | 259/191 |
| 4,210,796 A | 7/1980 | Moerke | 219/137.63 |
| 4,387,834 A | * 6/1983 | Bishop | 222/413 |
| 4,545,504 A | * 10/1985 | Fabel et al. | 222/146.5 |
| 4,804,110 A | 2/1989 | Sperry et al. | 222/56 |
| 5,005,731 A | 4/1991 | Koehler et al. | 222/54 |

FOREIGN PATENT DOCUMENTS

| | | |
|---|---|---|
| AU | 655737 | 1/1995 |
| DE | 2823171 | 11/1979 |
| DE | 3221492 | 2/1984 |
| DE | 8612130.8 | 9/1986 |
| DE | 3616296 | 11/1987 |
| DE | 3808723 | 6/1989 |
| DE | 3835250 | 5/1990 |
| DE | 4236281 | 11/1995 |
| DE | 29718972.7 | 12/1997 |
| DE | 29818696.9 | 1/1999 |
| DE | 29818757.4 | 1/1999 |
| EP | 038644 | * 10/1981 |
| EP | 0637497 | 2/1995 |
| EP | 0663277 | 7/1995 |
| FR | 7323730 | 7/1974 |
| NL | 1010957 | 7/2000 |

* cited by examiner

*Primary Examiner*—Philippe Derakshani
(74) *Attorney, Agent, or Firm*—Liniak, Berenato, Longacre & White, LLC

(57) ABSTRACT

An extruder welding device for welding plastic workpieces is disclosed that includes an extruder unit equipped with a discharge device for plasticated plastic material. The discharge device has a discharge member that acts on the plastic material and is driven by a hydrostatic hydraulic motor.

15 Claims, 1 Drawing Sheet

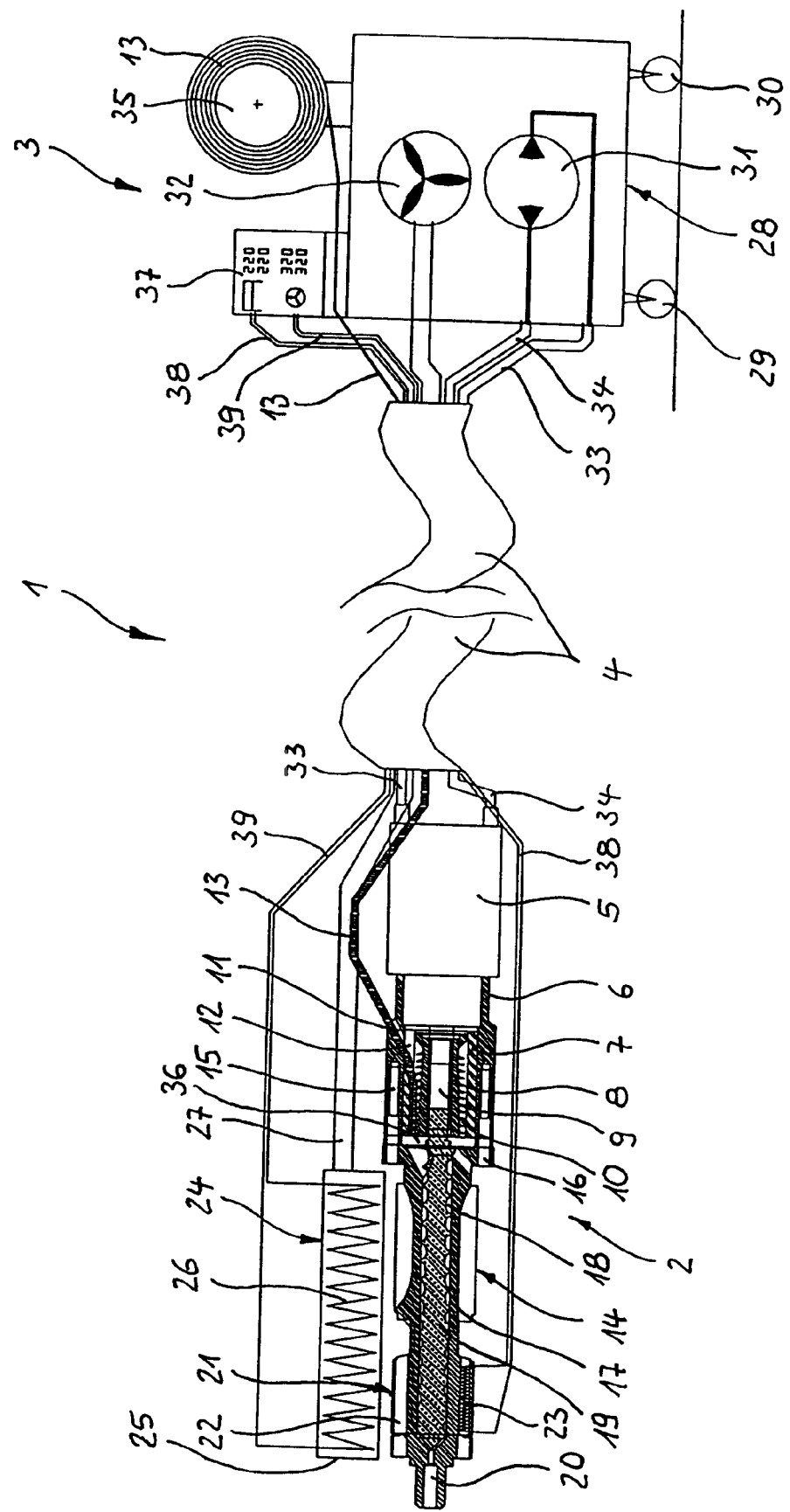

EXTRUDER WELDING DEVICE

FIELD OF THE INVENTION

The invention concerns an extruder welding device for welding plastic workpieces, having an extruder unit that is equipped with a discharge device for plasticated plastic material, the discharge device having a discharge member that acts on the plastic material and is driven by a motor.

BACKGROUND OF THE INVENTION

Extruder welding devices of this kind are known in a wide variety of embodiments (cf., for example, DE 32 21 492 C1, DE 42 36 281 C2, EP 0 663 277 A1, DE 38 08 723 C1, DE 38 35 250 C1, DE 36 16 296 A1, DE Unexamined patent application 28 23 171, EP 0 6377 497 A1, DE Utility Model 86 12 130.8, DE 297 18 972.7, DE 298 18 696.9, DE 298 18 757.4). They are used to weld plastic panels or other plastic workpieces.

The known extruder devices comprise an extruder unit having a drive, in the form of or similar to a handheld power drill, that is equipped with an extension unit removably placed thereon. Proceeding substantially in the longitudinal direction through this extension unit is a passthrough channel that has a conveying section having a conveying device, and a plasticating section having a heating device and a discharge device integrated therein. The conveying device is arranged close to the drive, while the plasticating section adjoins the free end of the extruder device. The conveying device has an axially extending conveying screw to which a rotary motion can be imparted by the drive. The conveying section of the passthrough channel extends parallel to the axis of this conveying screw, and is adapted to the diameter of a rod made of thermoplastic material in such a way that the rod, when introduced through an insertion opening, is gripped by the screw teeth of the conveying screw and pulled in and transported in an axial direction parallel to its axis. Multiple conveying sections can also be provided over the periphery of the conveying screw in order to allow rods of different diameters, or multiple wires simultaneously, to be drawn in.

The plasticating section of the passthrough channel is surrounded by an electrical heating device. This ensures that the plastic material of the rod is plasticated, i.e. melted, so that the plastic material emerges through a welding shoe in a plasticated state. The rod is previously reduced in size in a comminuting device arranged between the plasticating section and conveying section, so that it enters the plasticating section in pellet-like form. A comminuting device of this kind can be dispensed with if the plastic material is delivered from the outset in a pelletized state.

To allow the plasticated plastic material to emerge from the welding shoe, the extruder unit contains a discharge device having a discharge member that acts on the plastic material. In most embodiments of such extruder units, the discharge member is configured as a delivery screw, arranged in the passthrough channel of the plasticating section, which is nonrotatably joined to the conveying device for the plastic rod and is accordingly also coupled to the drive. During operation, a rotary motion is imparted to the delivery screw, which thus ensures discharge of the plasticated plastic material.

In another embodiment (cf. DE 298 18 757.4), a delivery screw is omitted. In this case the plasticated plastic material is transported by the advancing plastic rod toward the welding shoe, and discharged there. In this case the conveying screw, which draws in the plastic rod and transports it toward the plasticating section, constitutes the discharge member.

The known extruder units were based on the physical design of handheld power drills, which were then modified and expanded with an extruder attachment. Only electric motors have therefore hitherto been used for drive purposes. Electric motors of this kind have a poor power-to-weight ratio, and are bulky. Both characteristics interfere with handling of the extruder unit, and also are disadvantageous if, for example, it is to be added onto semiautomatic machinery or robots.

SUMMARY OF THE INVENTION

It is the object of the invention to configure an extruder welding device of the kind cited initially in such a way that the extruder unit weighs less and occupies less space.

This object is achieved, according to the present invention, by the fact that the motor is configured as at least one fluid motor. Fluid motors of this kind have substantially better power-to-weight and power-to-volume ratios than electric motors. In addition, they are characterized by constant-speed behavior largely independent of the requested torque.

The term "fluid motors" is understood to mean both hydraulic and pneumatic motors. Suitable hydraulic motors are, in particular, hydrostatic drives such as axial-piston, sliding-vane, or rotary-piston motors. A connection to a pressurized fluid source is needed to operate the fluid motors, but it can be separate from the actual extruder unit; the connection between the pressurized fluid source and fluid motor can be created via fluid hoses. Electrically driven hydraulic pumps or compressed-air generators are especially suitable as the pressurized fluid source.

The configuration according to the present invention is suitable for any type of extruder welding unit that has a drive system for discharging the plasticated plastic material. The good power-to-weight and power-to-volume ratios make handling of the extruder unit substantially easier. For this reason, it is also better suited for use in semiautomatic machinery or robots.

In an embodiment of the invention, provision is made for fluid hoses to be attached to the fluid motor in order to supply it with a fluid, e.g. hydraulic oil or compressed air, the fluid hoses preferably being combined into a hose bundle. The hose bundle can also include an air hose if the extruder unit has a seam preheating device in which air delivered through the air hose is heated and delivered to the seam region. There also exists the possibility of integrating into the hose bundle a rod delivery hose for delivering the plastic material in rod form. If the extruder unit requires a supply of electricity, for example for an air heating device and/or for the control system for the fluid motor, the hose bundle can also contain at least one electrical line. The concept underlying these features is that of eliminating from the extruder unit itself, to the greatest extent possible, all devices that might increase its weight or volume.

In a further embodiment of the invention, provision is made for a pressurized fluid generator, for example a hydraulic pump or a compressed air generator, to be attached to the ends of the fluid hoses remote from the extruder, for example to be arranged in a housing mounted on casters. This allows the extruder welding device to be used at any desired location, provided only that energy is available for operating the pressurized fluid generator. The pressurized fluid generator preferably has a receptacle for a reel of rod made of the plastic material, and also an air supply device that is connected via an air hose to the extruder unit. This does not exclude the possibility that the air supply device and/or the receptacle for the rod reel are arranged on the extruder unit itself. What must then be accepted, however, is the disadvantage that the weight and volume of the extruder unit are thereby increased.

In a further embodiment of the invention, provision is made for a rotation speed control device for adjusting the rotation speed of the fluid motor to be provided. With hydraulic motors in particular, a rotation speed control device of this kind is easy to set up. The rotation speed control device can have a bypass controller that is arranged on the fluid motor and/or on a pressurized fluid generator connected to the fluid motor. Alternatively, the rotation speed control device can also have a rotation speed controller for a pressurized fluid generator connected to the fluid motor. The rotation speed control device can have a rotation speed adjustment device on the extruder unit that is connected via a control line to the rotation speed control device. The rotation speed control device should preferably have a control loop to stabilize the rotation speed that is set.

BRIEF DESCRIPTION OF THE DRAWING

The invention is elucidated in more detail, with reference to an exemplary embodiment, in the drawings.

FIG. 1 shows an extruder welding device (labeled as a whole with the number 1) that substantially comprises two parts, namely on the one hand a handleable extruder unit 2 and on the other hand a supply device 3, extruder unit 2 and supply device 3 being connected by a flexible hose bundle 4 (only a short portion of which is depicted here).

DETAILED DESCRIPTION OF THE INVENTION

Extruder unit 2 has a hydraulic motor 5 that can be configured, for example, as an axial-piston, sliding-vane, or rotary-piston motor. Immovably joined to the housing of hydraulic motor 5 is an outer sleeve 6 which protrudes beyond the latter in an axial direction. An inner sleeve 7 that is immovably joined to outer sleeve 6 is placed into outer sleeve 6, and surrounds a conveying screw 8 that sits on drive shaft 9 of hydraulic motor 5 and is nonrotatably joined to it. Externally, conveying screw 8 has conveying threads 10. The envelope generated by conveying threads 10 is conical, with a diameter that increases in the direction away from hydraulic motor 5.

Outer sleeve 6 has a draw-in orifice 11, directly obliquely toward conveying screw 8, that corresponds to a draw-in slot 12 in inner sleeve 7 in such a way that a plastic rod 13 can be introduced from outside into the space between inner sleeve 7 and conveying screw 8, the plastic rod being guided externally in a semicircular conveying channel in inner sleeve 7. As a result of the rotation of conveying screw 8 by way of hydraulic motor 5, plastic rod 13 is entrained and moved in the direction away from hydraulic motor 5.

A plasticating device 14 is flange-mounted onto the end surface of outer sleeve 6 by way of bolts 15, 16. Plasticating device 14 has a tubular plasticating housing 17 through which passes a passthrough channel 18 of circular cross section. Arranged in passthrough channel 18 is a delivery screw 19 that extends in as far as conveying screw 8 and at that point is nonrotatably joined to it. Passthrough channel 18 terminates in a discharge opening 20 through which the plastic material can emerge.

Arranged toward the free end of plasticating device 18 is a heating device 21 that surrounds plasticating housing 17 with a sleeve 22 in which heating coils 23 are arranged. Also schematically depicted is a seam preheating device 24 that extends parallel to plasticating housing 17 and has an air outlet 25 close to outflow opening 20 of passthrough channel 18. Seam preheating device 24 contains a heating coil 26, and on the side facing away from air outlet 25 is supplied with air via an air delivery hose 27. That air is heated by heating coil 26 and emerges through air outlet 25, striking the seam region of the workpieces that are to be welded and thereby preheating it.

Supply device 3 has a supply housing 28 that is movable on casters 29, 30. Supply device 3 is depicted at a smaller size compared to extruder unit 2. A hydraulic pump 31 and a fan 32 are arranged inside supply housing 28. Attached to hydraulic pump 31 are two hydraulic hoses 33, 34 that are guided via hose bundle 4 to hydraulic motor 5, thus creating a hydraulic circuit. By way of a rotation speed control device either on hydraulic pump 31 or on hydraulic motor 5, the latter's rotation speed can be adapted to particular requirements. Fan 32 is connected to air delivery hose 27 that passes via hose bundle 4 to seam preheating device 24. It is understood that seam preheating device 24 can also be arranged inside supply device 3 attached to fan 32, in order to relieve the load on extruder unit 2 even further.

Arranged on the upper side of supply housing 28 is a freely rotatable reel 35 on which a supply of plastic rod 13 is wound. Plastic rod 13 is pulled off reel 35 and extends in hose bundle 4 inside a guide hose to extruder unit 2. There it enters the interior of extruder unit 2 via draw-in orifice 11 and draw-in slot 12, the pulling-off action being effected by conveying screw 8. Located at the end of conveying screw 8 is a rotary knife 36 that is nonrotatably joined to conveying screw 8 and divides plastic rod 13 into individual rod fragments. These then pass into passthrough channel 18 of plasticating device 14, and there are transported toward outlet opening 20. The plastic material heats up as a result of friction and compression. Heating device 21 also ensures plastication of the plastic material, so that a plasticated plastic bead emerges from outlet opening 20.

Also arranged on the upper side of supply housing 28 is a control device 37 for supplying electrical power to heating device 21 via an electrical cable 38 and to seam preheating device 24 via an electrical cable 39. Both electrical cables 38, 39 are guided through hose bundle 4. The temperatures of heating device 21 and of seam preheating device 24 can be adjusted by way of control device 37. Regulating devices ensure stabilization of the temperatures. Control device 27 can also contain all the control elements necessary for activating, deactivating, and adjusting hydraulic pump 31, fan 32, and the power supplies. It is understood that these control elements can also be provided on extruder unit 2, and specifically in addition to, and thus parallel to, those on control device 37.

With the exception of hydraulic pump 31, the units and devices arranged on supply device 3 can also be arranged, individually or in their entirety, on extruder unit 2, its weight and volume will thereby be increased. Nevertheless, the overall power-to-weight and power-to-volume ratios will then still be better than with known extruder units having an electric motor.

Hydraulic pump 31 need not be arranged, as depicted, in axial alignment with the other parts of extruder unit 2. It can also be arranged at right angles pointing downward, and rotary motion transfer can be effected via a bevel gear drive. The advantage of this arrangement is that it forms a handle similar to those on known extruder units.

What is claimed is:

1. An extruder welding device (1) for welding plastic workpieces, having an extruder unit (2) that is equipped with a discharge device for plasticated plastic material, the discharge device having a discharge member (19) that acts on the plastic material and is driven by a motor (5), characterized in that the motor is configured as at least one hydrostatic hydraulic motor (5).

2. An extruder welding device (1) for welding plastic workpieces, having an extruder unit (2) that is equipped with a discharge device for plasticated plastic material, the discharge device having a discharge member (19) that acts on the plastic material and is driven by a motor (5), characterized in that the motor is configured as at least one fluid motor (5) and fluid hoses (33, 34), which can be connected to a pressurized fluid generator (31), are attached to the fluid motor (5) in order to supply it with a fluid.

3. The extruder welding device as defined in claim 2, characterized in that the fluid hoses (33, 34) are combined into a hose bundle (4).

4. The extruder welding device as defined in claim 3, characterized in that the hose bundle (4) includes an air hose (27) for delivering air for a seam preheating system.

5. The extruder welding device as defined in claim 3, characterized in that the hose bundle (4) includes a rod delivery hose for delivering the plastic material in rod form (13).

6. The extruder welding device as defined in claim 3, characterized in that the hose bundle (4) includes at least one electrical line (38, 39) for supplying power to an air heating device (24) and/or for the control system for the hydraulic motor (5).

7. The extruder welding device as defined in of claim 2, characterized in that a pressurized fluid generator (31) is attached to the ends of the fluid hoses (33, 34) remote from the extruder.

8. The extruder welding device as defined in claim 7, characterized in that the pressurized fluid generator (31) is arranged on casters (29, 30).

9. The extruder welding device as defined in claim 7, characterized in that the pressurized fluid generator (31) has a receptacle (35) for a reel of rod made of the plastic material (13).

10. The extruder welding device as defined in claim 7, characterized in that the pressurized fluid generator (31) has an air supply device (32) that is connected via an air hose (27) to the extruder unit (2).

11. The extruder welding device as defined in claim 1, characterized in that a rotation speed control device for adjusting the rotation speed of the hydrostatic hydraulic motor (5) is provided.

12. The extruder welding device as defined in claim 11, characterized in that the rotation speed control device has a bypass controller that is arranged on the hydrostatic hydraulic motor (5) and/or on a pressurized fluid generator (31) connected to the hydrostatic hydraulic motor (5).

13. The extruder welding device as defined in claim 11, characterized in that the rotation speed control device has a rotation speed controller for a pressurized fluid generator (31) connected to the hydrostatic hydraulic motor (5).

14. The extruder welding device as defined in claim 12, characterized in that the rotation speed control device has a rotation speed adjustment device on the extruder unit (2) that is connected via a control line to the rotation speed control device.

15. The extruder welding device as defined in claim 11, characterized in that the rotation speed control device has a control loop to stabilize the rotation speed that is set.

* * * * *